United States Patent [19]
Guttinger

[11] Patent Number: 6,044,957
[45] Date of Patent: Apr. 4, 2000

[54] MULTIPLE ITEM LOADING SYSTEM AND METHOD

[75] Inventor: Peter Guttinger, Milton, Canada

[73] Assignee: Langen Packaging, Inc., Ontario, Canada

[21] Appl. No.: 09/036,986

[22] Filed: Mar. 9, 1998

[51] Int. Cl.[7] .................................................. B65G 57/06

[52] U.S. Cl. .................. 198/418.3; 198/358; 198/370.01

[58] Field of Search ................................ 198/418.3, 358, 198/360, 370.01

[56] References Cited

FOREIGN PATENT DOCUMENTS 1596557  8/1981  United Kingdom ................ 198/418.3

*Primary Examiner*—Christopher P. Ellis
*Assistant Examiner*—Mark Deuble
*Attorney, Agent, or Firm*—David P. Gordon; David S. Jacobson; Thomas A. Gallagher

[57] ABSTRACT

A system for loading two items, such as bags, into a bucket on a bucket conveyor, first selects a first item for delivery to a second loading station. Thereafter, a second item is delivered to a first loading station and then loaded into a bucket at the first loading station. The bucket is then moved to the second loading station where it is loaded with the first item.

30 Claims, 12 Drawing Sheets

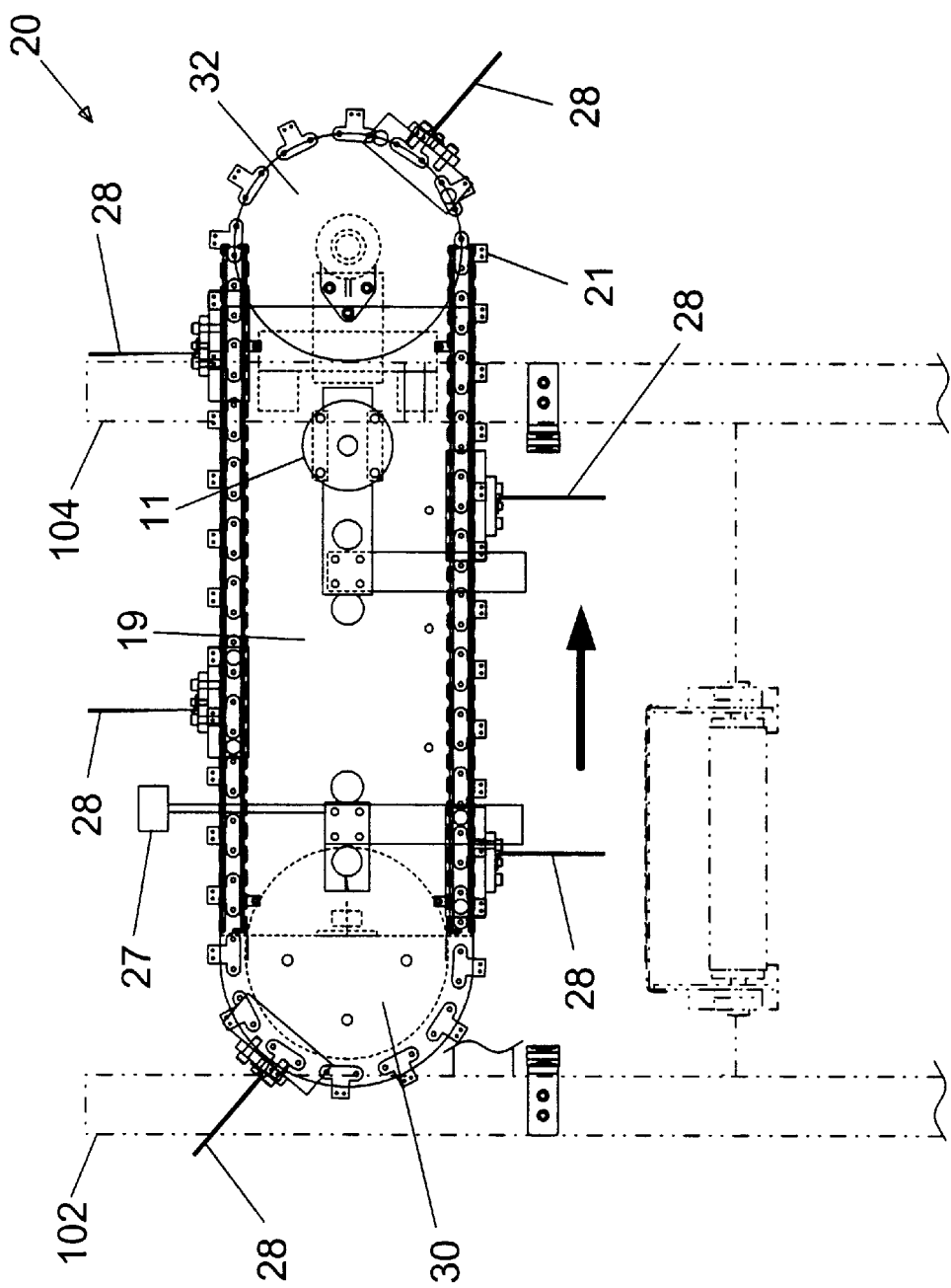

MULTIPLE ITEM LOADING SYSTEM AND METHOD

FIELD OF THE INVENTION

This invention relates to a method and apparatus of loading multiple items into an item holder. One of many applications of the method and apparatus is for use in conjunction with a container loading machine, to load multiple items into a bucket on a bucket conveyor.

BACKGROUND OF THE INVENTION

In the packaging industry, it is often necessary to load two or more items into a container, typically a carton or box. These items may or may not be rigid or have rigid exteriors. For example, a cereal box may need to be loaded with a pair of sealed plastic bags of cereal.

A typical technique for putting a single item into a container, consists of transferring an item from an item supply conveyor or other item supply device into a holder, such as a bucket. This bucket, once loaded is moved along a predetermined path on a conveyor to a container loading station. At the container loading station a container loading machine such as a pusher arm, will load the item from the bucket into the container.

When only a single item is to be loaded into a container, the method is relatively straightforward. Problems are encountered, however, when it is desired to load more than one item into a single container. Loading of multiple items into a container can take place either sequentially or simultaneously, but particularly when the item is flexible, the latter approach is preferred.

With sequential loading, a single item is loaded into each of a series of buckets, and then the container is loaded with items from successive buckets. A container is loaded with one item from a first bucket by means of a container loading machine. A second item is then loaded into the container (which is already partially filled with the first item) from a subsequent bucket on the conveyor. Difficulty in loading the second item into the container is encountered due to physical interaction between the two items.

To try to overcome problems associated with sequential loading of the container with items from successive buckets, the packaging industry began loading two items into a single bucket. The two items are then loaded simultaneously into the container. This method reduces the amount of problematic physical interaction between the two items when loading the items into a container.

One way of simultaneous loading of a container includes having a hesitating bucket at the bucket loading station. The bucket conveyor is designed to permit hesitation of the bucket at the bucket loading area. While remaining stationary, a single bucket is loaded with two items, each item being sequentially loaded into a bucket at the bucket loading station. Due to a finite amount of hesitation that can be incorporated into a continuous conveyor system, an overly long delay or a problem with feeding the second item into the bucket, may result in the bucket leaving the loading station with only a partially filled bucket. This causes problems at the container loading station.

Two other solutions for simultaneous container loading are: (1) the index loader; and (2) the walking beam/robot arm loader.

An index loader requires three conveyors: (i) an item loading conveyor; (ii) an index bucket conveyor; and (iii) a primary bucket conveyor. The index conveyor and the primary bucket conveyor are oriented parallel to each other. The first item may be loaded, via a first item loading conveyor, by being moved onto a "bomb-bay". This first item drops into a bucket on the index conveyor when the bomb-bay is opened. The bomb-bay closes and the next item is then loaded onto the bomb-bay. The bomb-bay opens and the second item is dropped onto the first item. The bucket on the index conveyor remains at the station until it has received the requisite number of items (e.g. two). At this point, the index conveyor is then indexed one position forward thereby providing an empty bucket to repeat the first process. At a later station along the index conveyor, the items in the bucket are simultaneously loaded into a loader bucket moving on the primary, continuous bucket conveyor which has a hesitation feature. A drawback of this type of loader is that an additional, index bucket conveyor (compared with the single item loader) is required for multi-item loading functionality. Moreover, existing single item, sequential loading systems are not easily nor cost effectively retrofitted to add this functionality.

The walking beam/robot arm loader consists of a horizontal arm which has two separate suction type devices, one located at each end. The walking beam is positioned above, and is substantially aligned in the longitudinal direction with, a bucket conveyor. In its first position, one suction device of the arm is located directly above a loading platform. A first item is transported to a loading platform by an item supply conveyor. The bucket conveyor is positioned at an oblique angle relative to the item supply conveyor. The second suction device of the arm is located further downstream in relation to the bucket conveyor. The first suction device grips the item and the arm is moved in a direction upstream, relative to the bucket conveyor's direction of travel, to a point where the first suction device (with an item) is located directly above an empty bucket and the second suction device is simultaneously located above the loading platform. Contemporaneously with the movement of the arm, the supply conveyor has transported a second item to the loading platform. The first suction releases the item into an empty bucket while the second suction device simultaneously grips a second item from the loading platform. The arm is then moved back to its original position. The second suction device is now co-located directly above a bucket which contains a single item. As the first suction device grips an item, which has been conveyed to the landing site by the first conveyor, the second suction device simultaneously releases the second item into the bucket. The items are then loaded from the bucket into a box in a conventional manner. A drawback with this type of loader is that it does not use, nor is it easily adapted from, the single item loader mechanism. Moreover, problems are encountered if either suction device, when over the landing site, fails to pick up an item. This again, may result in a partially filled bucket leaving the loading station. A further drawback of this type of loader is its limitation to loading a maximum of two items per container and difficulty in operating the apparatus at high speeds.

Accordingly, it is desired to provide a method and apparatus for improved multi-item (i.e. two or more items) loading functionality and which may be operated at relatively high speeds. It is also desirable that such an apparatus or system be cost effectively adapted from existing single item loading mechanisms. Yet, the method and apparatus should attempt to minimize the likelihood of an item holder such as a bucket arriving at the container loading station carrying less than the full complement of items.

SUMMARY OF THE INVENTION

According to one aspect of the invention there is provided a system for loading first and second items into a holder, said system comprising: a conveyor having a holder, said holder being movable by said conveyor from a first position to a second position; a first loading station located proximate said first position; a second loading station located proximate said second position; an item deliverer to deliver items to said first loading station and said second loading station; a first loading apparatus to load said second item at said first loading station into said holder; and a second loading apparatus to load said first item at said second loading station into said holder; said system being operable to load said holder with said first and second items by: (a) said item deliverer delivering said first item to said second loading station and said second item to said first loading station; (b) said first loading apparatus loading said second item from said first loading station into said holder at said first position after said first item has been selected by said item deliverer for delivery to said second loading station; (c) said conveyor moving said holder carrying said second item from said first position to said second position; and (d) said second loading apparatus loading said first item from said second loading station into said holder at said second position, whereby said holder is loaded with said first and second items.

According to another aspect of the invention there is provided a method of loading two items into a holder carried by a conveyor from a first position proximate a first loading station to a second position proximate a second loading station, said method comprising the steps of: (a) selecting a first item for delivery to said second loading station; (b) delivering said first item to said second loading station; (c) delivering a second item to said first loading station; (d) after step (a), loading said second item from said first loading station into said holder at said first position; and (e) after step (d), loading said first item from said second loading station into said holder located at said second position.

According to another aspect of the invention there is provided a method of loading two items into a holder carried by a conveyor from a first position proximate a first loading station to a second position proximate a second loading station, said method comprising the steps of: (a) delivering a first item to said first loading station; (b) determining whether there is an item at a second loading station; (c) in determining there is no item at said second loading station in step (b), delivering said first item at said first loading station to said second loading station; (d) delivering a second item to said first loading station; (e) loading said second item at said first loading station into said holder located at said first position; (f) loading said first item from second loading station into said holder located at said second position.

According to another aspect of the invention there is provided a method of loading two items into a holder carried by a conveyor from a first position proximate a first loading station to a second position proximate a second loading station, said method comprising the steps of: (a) selecting a first item for delivery to said second loading station; thereafter (b) delivering said first item to said second loading station; and (c) delivering a second item to said first loading station and loading said holder with said second item; thereafter (d) loading said holder, carrying said second item, at said second position with said first item.

BRIEF DESCRIPTION OF THE DRAWINGS

The present invention will be more clearly understood after reference to the following detailed specification read in conjunction with the drawings wherein:

FIG. 1b is a similar, side elevational view, of the system of FIG. 1a.

FIG. 2 is an enlarged side elevational view of part of FIGS. 1a and 1b.

FIG. 5 is an end sectional view along 5—5 in FIG. 1a.

FIG. 6 is an end sectional view along 6—6 in FIG. 1a.

DETAILED DESCRIPTION OF THE PREFERRED EMBODIMENT

Figure 1A:
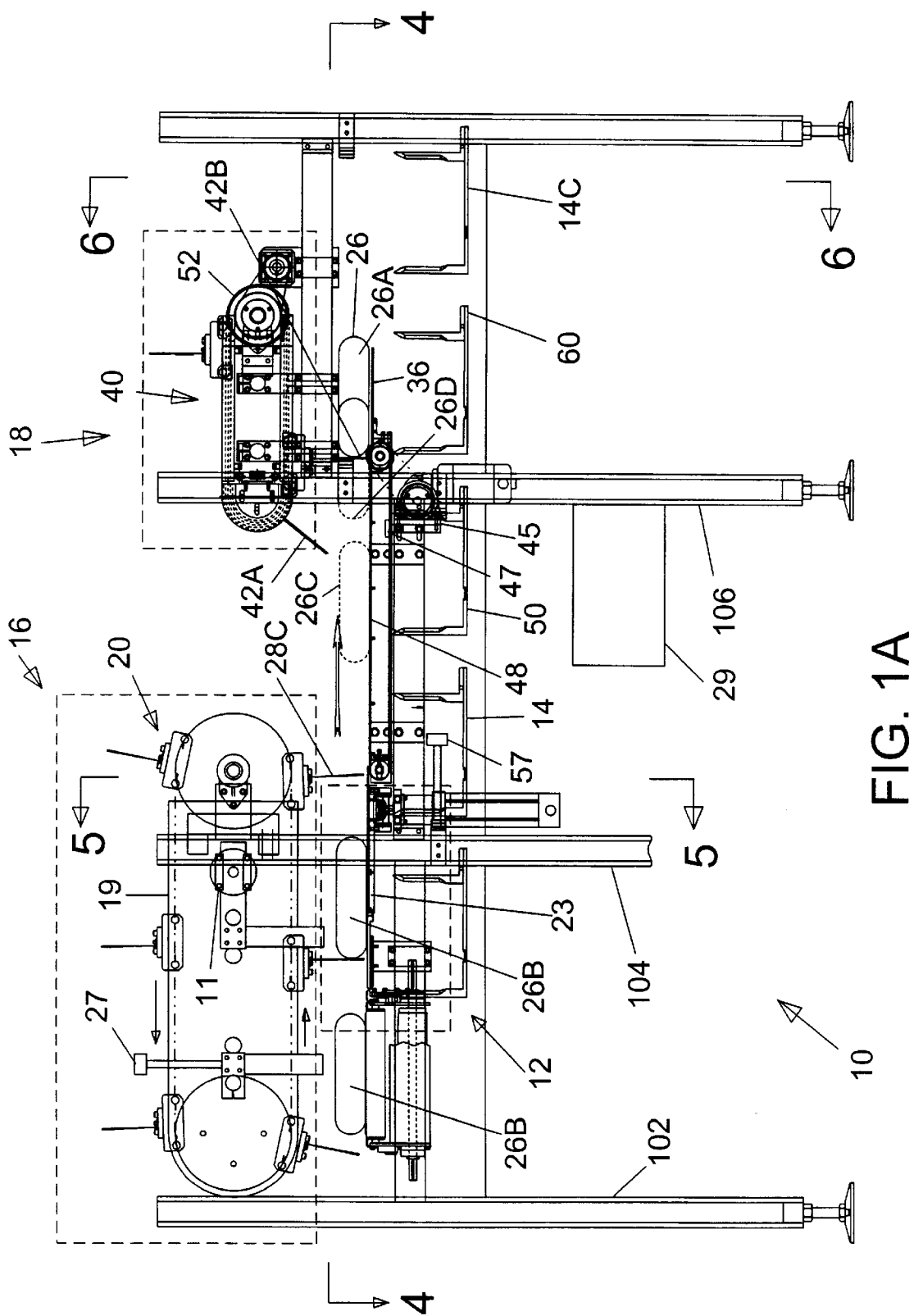
FIG. 1a is a side elevational view of a multi-item loading system constructed in accordance with one embodiment of the invention.
Figure 1B:
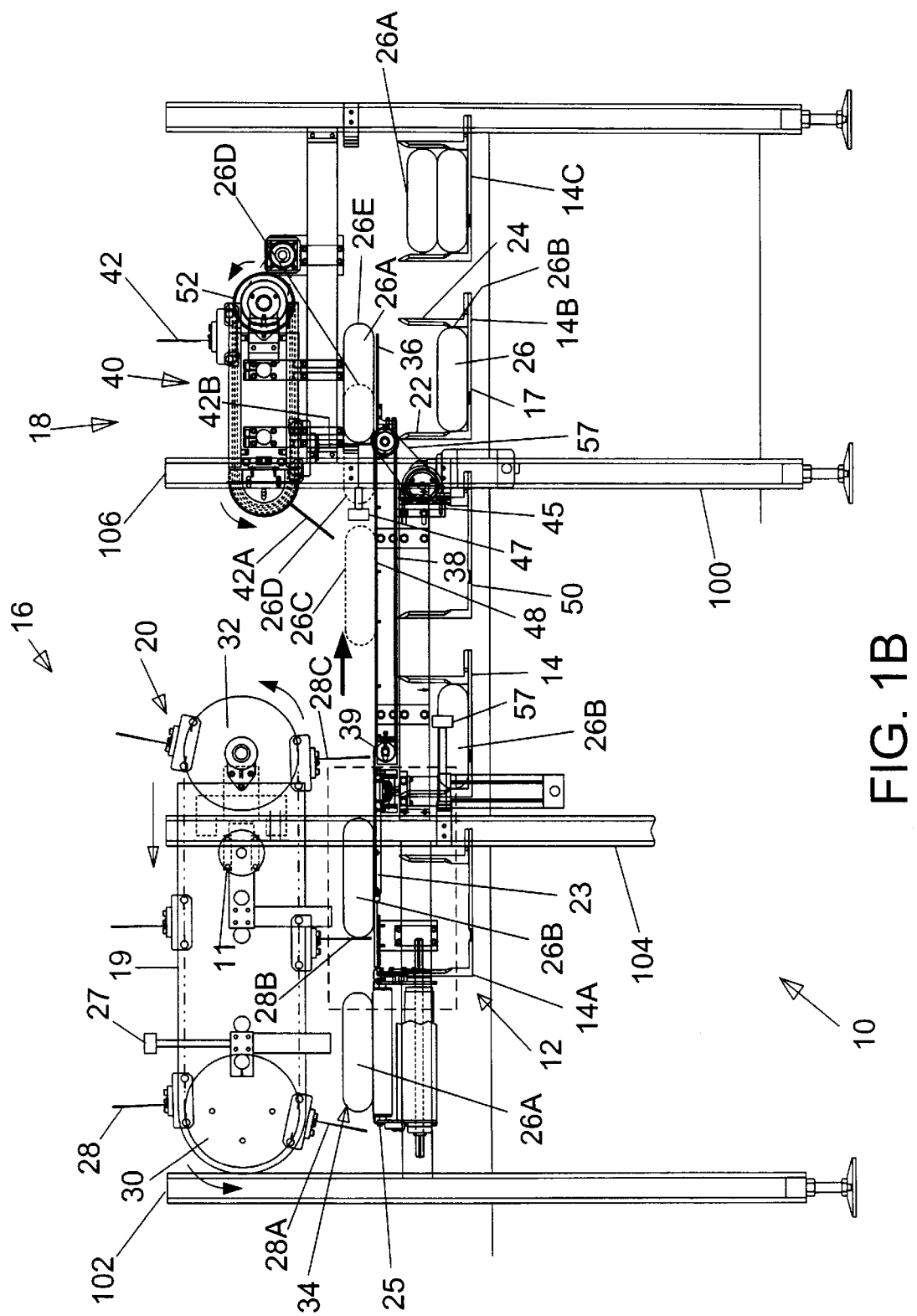

Referring to FIGS. 1a, 1b, 5 and 6, a multi-item loading system generally designated 10, consists of a continuous conveyor system 12 having a plurality of holders, which in this embodiment are buckets 14, carried by the conveyor in series. The continuous conveyor system (shown only schematically in the figures) is conventional and moves buckets 14 from a first position 14a, which is proximate a first item loading station generally designated 16, to a second position 14b, and then to a third position 14c. Second and third positions 14b and 14c are both proximate a second item loading station generally designated 18. Buckets 14 each have a base 17 and a pair of spaced, parallel, transversely oriented side walls 22, 24, capable of receiving and retaining two stacked items generally identified as 26 therebetween, as shown in FIG. 1b at position 14c. Each of the buckets has transverse openings to permit the transverse discharge of an item held in a bucket by conventional means. Items 26 may be any type of articles which one wishes to load into a container. In this preferred embodiment, items 26 are flexible bags containing a product such as cereal or other similar granular product.

Figure 4:
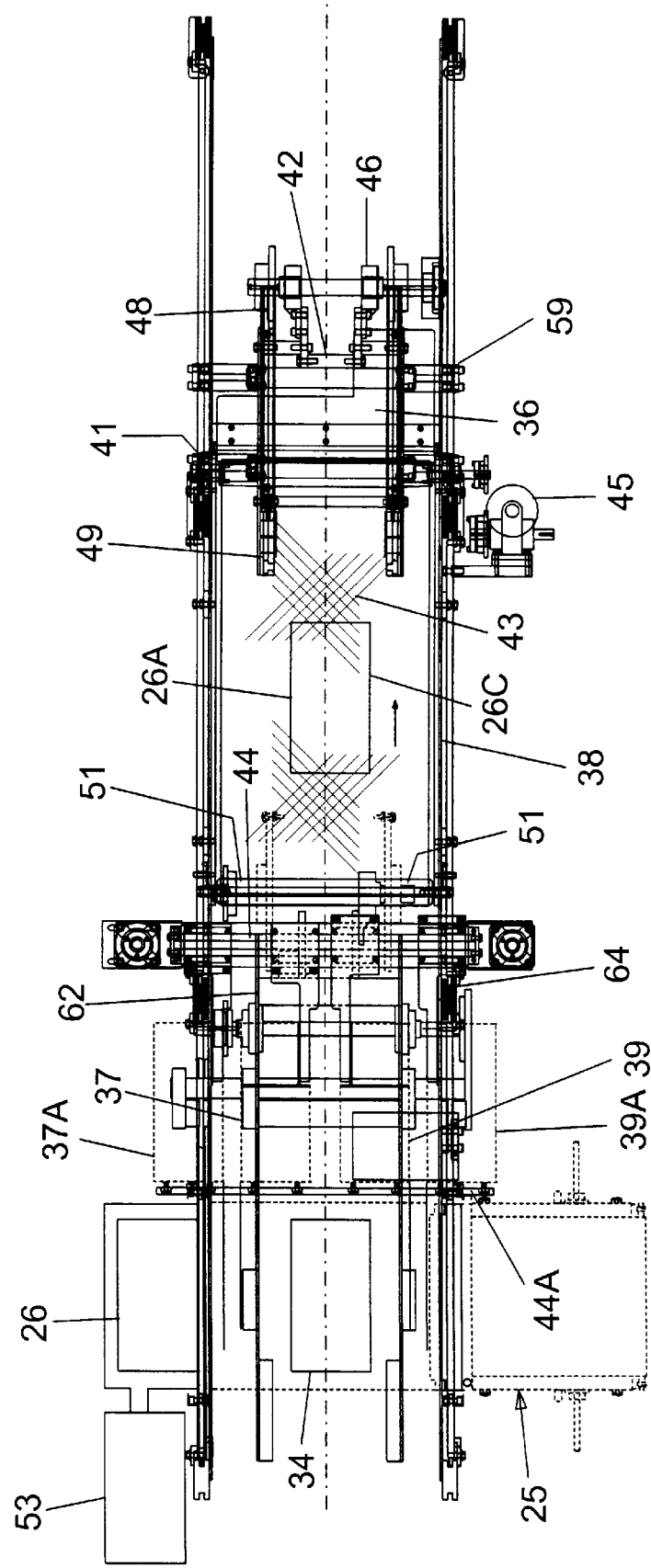
FIG. 4 is a top view of a portion of the system of FIGS. 1a and 1b.
Figure 5:
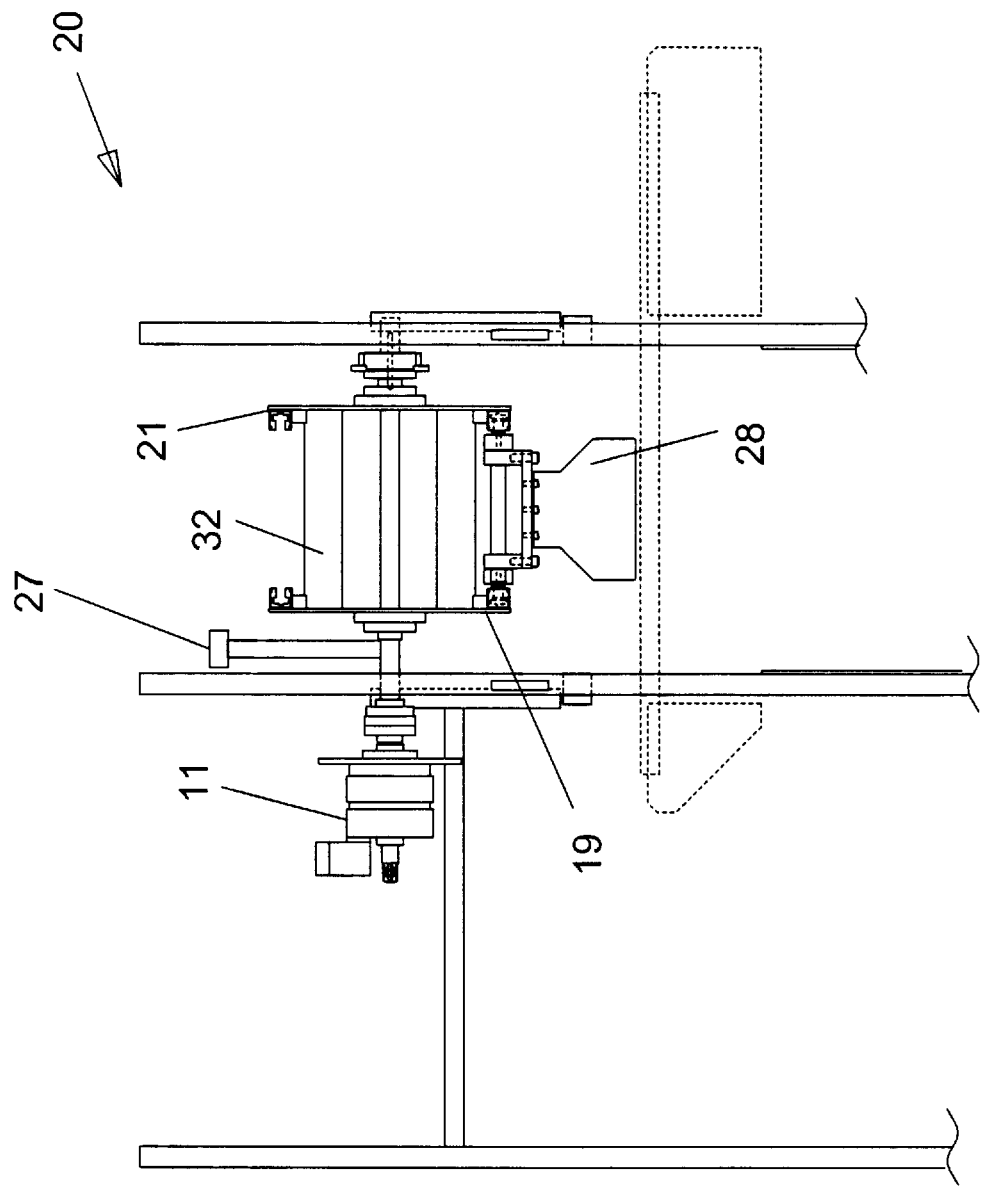

An item deliverer comprises the combination of the following components: a conventional item feeder, shown schematically in FIG. 4 as 53, an item supply conveyor 25, an item positioning device 20, item transfer conveyor 38 and item positioning device 40, which together combine to deliver items to first loading station 16 and second loading station 18. As will be described hereinafter, in this embodiment, item positioning device 40 also is adapted to be an item loading device to load items from second loading station 18 into a bucket 14 which is at position 14b, and which thereafter moves to position 14c.

First loading station 16 consists of an elevated first loading platform 23 which is secured to a frame which includes elements 102, 104, 106 and which is positioned near the upper discharge end of a conventional item supply conveyor 25. An item positioning device 20 comprises a first sweeper 19 mounted to frame element 104 above and perpendicular to the item supply conveyor 25. First sweeper 19 has a plurality of paddles 28 which are mounted transversely to a drive chain 21 (see FIG. 2). Drive chain 21 is engaged by rotatably mounted drums 30 and 32, one or both of which are driven by a motor 11. The drums 30, 32 operate to continuously rotate paddles 28 about the obround path formed by drive chain 21 wrapped around drums 30, 32.

The first sweeper 19 operates continuously and will sweep an item that has reached discharge position 34 on item supply conveyor 25, on to first loading platform 23. A sensor 27, which may be a conventional opto-electronic eye sensor, is adapted to detect a paddle 28 crossing its field of detection. The sensor 27 is interconnected to an electronic signalling device 29 which is able to send a signal to an item feeder 53 (in FIG. 4) to drop an item, on receipt of the signal, on to the item supply conveyor 25.

Referring to FIGS. 1a, 1b, 4 and 5, first loading platform 23 operates as a loading device and comprises a pair of oppositely disposed bomb bay doors 37, 39, each one supported by a support arm 62, 64. Each support arm 62 and 64 is mounted for transverse, reciprocating movement, supported between shaft 44 and rail 44a. In FIG. 4, each of the doors 37 and 39 is shown in the closed, item retention position. Each door 37, 39 is driven by a belt to provide for transverse, outward movement from the closed position, to an open position shown in FIG. 4 as 37a and 39a, thereby providing an opening through which an item can fall into a bucket positioned below platform 23. The doors may also be driven by the belt, back to the closed position. The movement of the doors is activated by an electronic signalling device, which can send a signal to a motor to drive the belt to open or close the doors 37, 39. Item positioning device 20 also co-operates with bomb bay doors 37, 39 to provide an item loading apparatus.

Second loading station 18 is similar to loading station 16 and consists of an elevated platform 36 mounted to the frame and which is also mounted in major-axis alignment above bucket conveyor 12 and is elevated to align with platform 23, but does not have bomb bay doors. Stretching between platform 23 and platform 36 is an item transfer conveyor 38, which operates continuously. Item transfer conveyor 38 does not require the use of buckets. Item transfer conveyor 38, which in the preferred embodiment is a belt conveyor as shown, comprises a transversely mounted idler shaft 51 proximate said first platform 23 and a transversely mounted drive shaft 41 proximate said second platform 36 mounted to a frame. Wrapped tightly around both shaft 51 and shaft 41 is a continuous belt 43 adapted to support and move an item thereon. A motor 45 is adapted to drive belt 43 through drive shaft 41.

Figure 3:
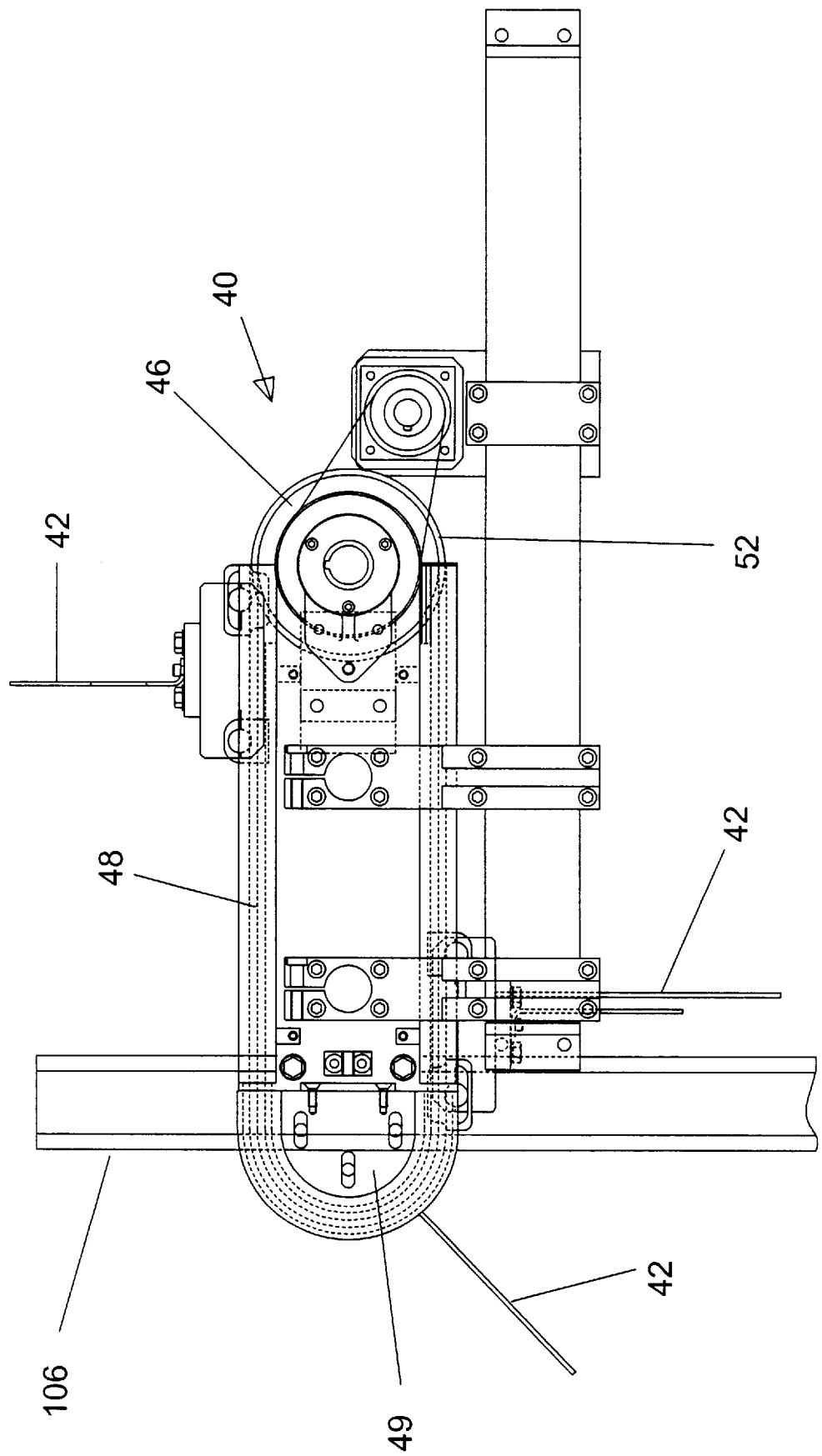
FIG. 3 is an enlarged side elevational view of another part of the system in FIGS. 1a and 1b.
Figure 6:
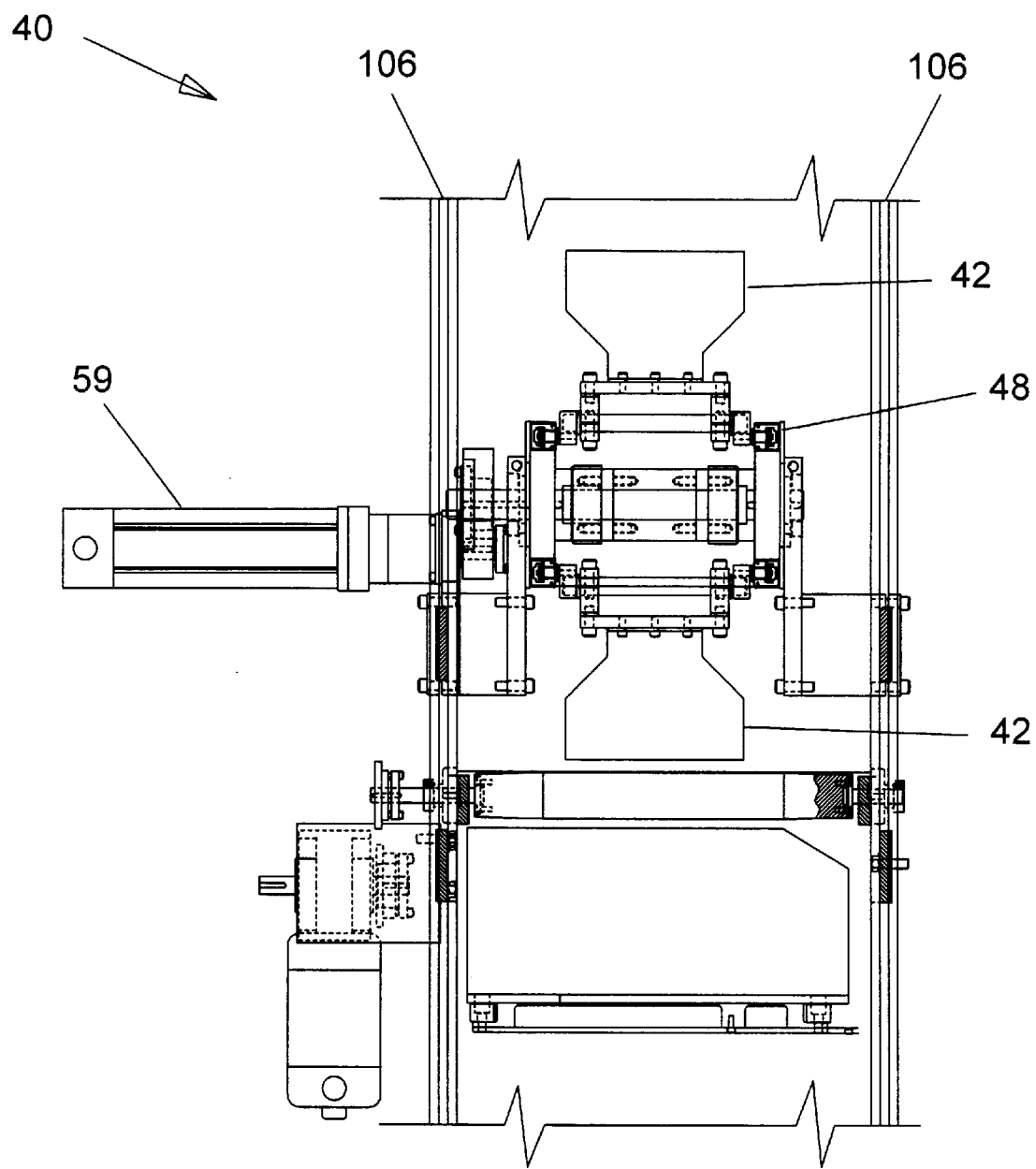

A second item positioning device 40 also operates as an item loading apparatus and comprises a second sweeper 52 mounted to frame element 106 above platform 36 and item transfer conveyor 38, and has a plurality of paddles 42 which are mounted transversely to a drive chain 48 (see FIGS. 3 and 6). The drive chain 48 follows an obround path and engages rotatably mounted drum 46 which is driven by a motor 59. The drum 46 operates to rotate paddles 42 about the obround path formed by drive chain 48, engaged around drums 46, 49. A second sensor 47, such as an opto-electronic eye, is also provided proximate the second loading station 18 and is adapted to detect the presence of an item proximate the second platform 36, at position 26d. Once an item is detected by sensor 47 at position 26d, a signalling device 29, responsive thereto, is adapted to be able to send a signal to sweeper 52 to cause a paddle 42 to move an item from position 26d to position 26e shown in FIG. 1b. Also, upon detection of an item at position 26d, signalling device 29, in response thereto, is adapted to be able to send a signal to cause bomb bay doors 37, 39 to move from a closed position to an open position. This will allow a following item to be loaded into bucket 14 at position 14a once a first item is detected by sensor 27 to be at position 26d. Alternatively, signalling device 29 may be adapted such that it does not send this signal causing bomb bay doors 37, 39 to open until item 26A is being moved to position 26e.

Figure 7:
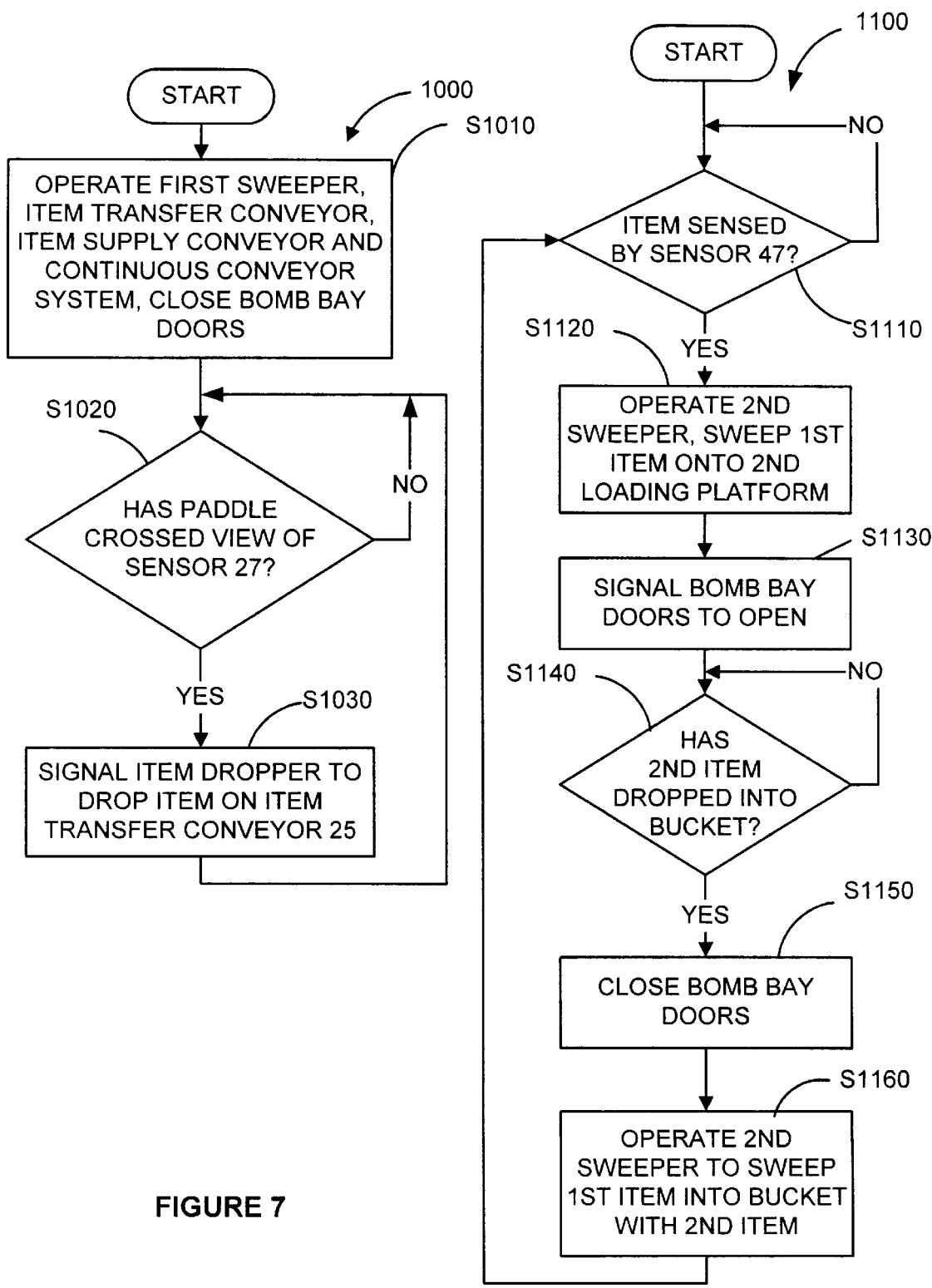
FIG. 7 is a flow chart illustrating one method of operation of the system of FIGS. 1a–6.

A general overview of steps taken in the operation of the components of the system is illustrated in the schematic in FIG. 7. These are referred to generally as operations 1000 and 1100. The first step is to begin the operation of the first positioning device 20 and the continuous conveyor system 12, which will then operate synchronously and continuously (S1010). Sensor 27 operates to detect the transit of paddles 28 (S1020). Once a paddle 28 crosses the sensor's 27 field of detection, a signal is sent by signalling device 29 to the item feeder 53 to drop an item on to item supply conveyor 25 (S1030). The relative timing of the dropping of the item is such that once the item reaches position 34, a paddle 28 will be positioned to sweep the item onto platform 23. If the bomb bay doors 37, 39 are not open, the paddle 28 will sweep the item onto item transfer conveyor 38, which moves the item toward platform 36. Operations 1000 are performed continuously. Contemporaneously with the performance of operations 1000, operations 1100 are carried out.

Operations 1100 involve the operation of second loading device 40. Sensor 47 detects the presence of a first item 26A which has been moved by item transfer conveyor 38 to position 26d (S1110). Upon detection of the first item 26A at position 26d, signalling device 29 signals the second sweeper 52 to operate. The operation of second sweeper 52 sweeps item 26A from position 26d to position 26e, that is, on to platform 36. Second sweeper 52 then ceases to operate (S1120). Signalling device 29 also responds to the arrival of item 26A at position 26d by signalling bomb bay doors 37, 39 to open (S1130). As operations 1000 are contemporaneously being carried out, a second item 26B will have been swept from item supply conveyor 25 towards the open bomb bay doors 37, 39 by first sweeper 19 which is moving at the same horizontal velocity as bucket conveyor 12. The movement of paddles 28 and buckets 14 are synchronized such that the second item 26B will pass through the open bay doors 37, 39 and fall into a bucket 14 at position 14a. Sensor 57 (FIG. 1b) operates to detect the presence of second item 26B in bucket 14 (S1140) as the bucket moves toward position 14c. Upon detection of item 26B in bucket 14, signalling device 29, in response thereto, signals bomb bay doors 37, 39 to close (S1150). Signalling device 29 also sends another signal to operate second sweeper 52. The movement of sweeper 52 in response is such that second sweeper 52 sweeps item 26A from position 26e into bucket 14 holding item 26B (S1160).

The specific operation of the preferred embodiment illustrated in FIGS. 1a–6 is now described in detail. FIG. 1a shows items 26A and 26B in various positions as they are delivered to loading stations 16 and 18. FIG. 1b shows items 26A and 26B at certain positions during and after loading into the bucket.

Item positioning device 20 operates continuously and acts as a controller for the supply of items from item supply conveyor 25. Sensor 27 detects the transit of a paddle 28 of sweeper 19 across its field of detection. Upon sensor 27 detecting a paddle 28, signalling device 29 will signal the item feeder 53 (in FIG. 4) to drop an item on to the item supply conveyor 25. The interactions of the first sweeper 19, sensor 27, signalling device 29, the item feeder 53 and item supply conveyor 25 ensures that spacing between items deposited by the item feeder 53 on item supply conveyor 25 is a whole number multiple of the spacing between paddles 28 on first sweeper 19. Moreover, items conveyed by the item supply conveyor 25 will arrive at discharge position 34 when a paddle 28 is at position 28a. As such, continuously operating first sweeper 19 will sweep an item from discharge position 34 on to first loading platform 23 as paddle 28 moves from position 28a to position 28b. As such, item 26 will be swept from discharge position 34 on item supply conveyor 25 to position 26b. In an alternate embodiment, uneven spacing of items 26 on item supply conveyor 25 can be accommodated by providing a conveyor 25 which, in conjunction with a controller, can operate intermittently to compensate for improper spacing. If bomb bay doors 37, 39 are in the item retention position (i.e. closed), sweeper 19, which operates continuously, will sweep item 26A from position 26b to position 26c on to item transfer conveyor 38. Item transfer conveyor 38, which also operates continuously, will convey item 26A to position 26d, proximate sensor 47. Upon sensor 47 detecting the presence of item 26A at position 26d, signalling device 29 signals second sweeper 52 to operate. Second sweeper 52 operates to move the paddle 42, which will be at the ready position 42a, to position 42b, thereby sweeping item 26A from position 26d to position 26e. Second sweeper 52 will then move another paddle 42 to position 42a and then cease to operate. Upon detection of item 26A at position 26d, signalling device 29 also signals bomb bay doors 37, 39 to open.

Contemporaneously with the positioning of item 26A at position 26e, first positioning device 20 continues to operate. Upon a second item, item 26B, arriving at discharge position 34 on item supply conveyor 25, first sweeper 19 sweeps item 26B from position 26a to position 26b. However, in this instance bomb bay doors 37, 39 are in the open position, due to the signal received from signalling device 29. As such, item 26B drops through the opening created by the position of bomb bay doors 37a, 39a, dropping into bucket 14 at position 14a. Continuous conveyor system 12 is operated such that the rate of conveyance and positioning of buckets 14 is determined by the operation of first positioning device 20 and the position of paddles 28 on first sweeper 19. A bucket is conveyed at a speed equal to the speed of movement of the paddles 28 on first sweeper 19. Bucket conveyor 12 and sweeper 19 are synchronized so that a bucket 14 will be proximate to position 14a and beneath first platform 23 when item 26B drops through the open bay of first platform 23. Sensor 57 detects the presence of item 26B after it drops into bucket 14 and moves from position 14a toward position 14b. Upon said detection, signalling device 29 signals second sweeper 52 to begin operation. Second sweeper 52 operates to move paddle 42 at position 42b (located directly behind item 26A) thereby accelerating item 26A at position 26e to a zero horizontal velocity relative to buckets 14 on continuous conveyor system 12. The conveyor 12 and sweeper 52 are synchronized so that item 26A is pushed off platform 36 and falls into the bucket 14 carrying item 26B as bucket 14 reaches position 14c. Thus, the bucket once it reaches position 14c, will have received both items and can then be carried by the continuous bucket conveyor 12 to a conventional container loading machine (not shown), where both items are unloaded transversely and simultaneously from bucket 14 into a container. In another embodiment, bucket 14 could be constructed and the timing could be arranged so that when both items are loaded, items 26A and 26B are arranged in a side-by-side relationship, rather than being stacked one on top of the other.

In another embodiment, the loading of bucket 14 with the item 26B on platform 23 at position 14a, may be more easily facilitated by providing for a continuous conveyor that incorporates a hesitation feature, such as that described in the type of hesitating bucket conveyor of U.S. Pat. No. 5,226,524, the contents of which are hereby incorporated by reference.

An important feature is to provide that an item 26 is not loaded from platform 23 into a bucket 14, until an item 26A has at least been selected or identified for delivery to the second loading station. It is preferred that the item 26A have been received on, or be in the process of being delivered to the second loading station 18 before loading an item 26B into a bucket 14 at position 14a. Accordingly, in a variation of the preferred embodiment, signal device 29 may send a signal to sweeper 20 to move another item 26B on to platform 23, with the bomb bay doors open before the first item has reached position 26e, or even positions 26d or 26c. A disadvantage of not waiting until the first item is in position 26e, (or at least 26d) before loading item 26B into the bucket, is that if there is any problem in the first item 26A reaching the platform 36 at position 26e, a bucket may be loaded at the first loading station 16, but an item 26A may not actually arrive at platform 36 for loading at second loading station 18 when bucket 14, carrying the second item, arrives at a position proximate to platform 36.

The system described above may be readily adapted from a single item loader mechanism by adding a self-contained second loading station and second loading device, together with an item transfer device, to provide for the multi-item loading functionality described above. The prospects of an item not being delivered to a bucket from the second station are relatively low once an item has been identified and selected for delivery to the second station. Accordingly, this allows existing single item, sequential bucket loaders to be relatively easily retrofitted to provide vastly improved performance in loading multiple items.

Figure 8:
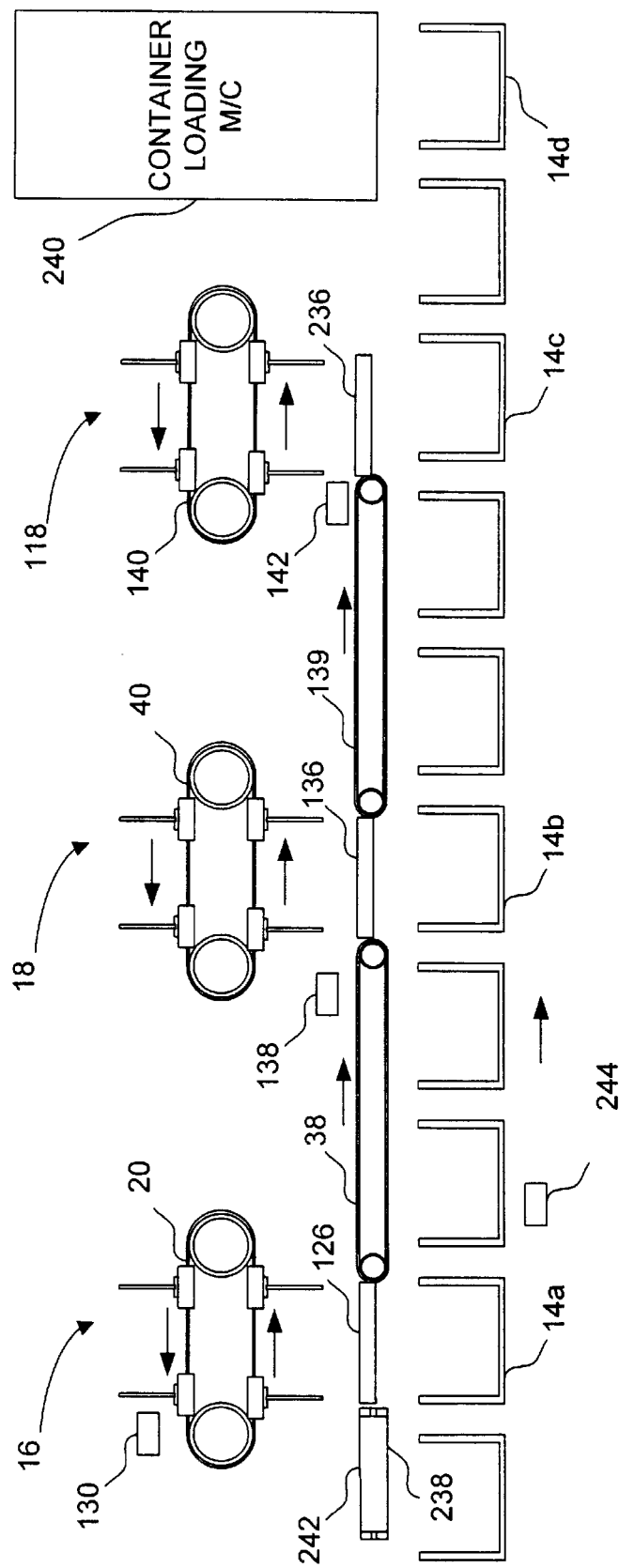
FIG. 8 is a schematic of another embodiment of a system constructed in accordance with the invention.

As set out schematically in FIG. 8, if it is desired to adapt the system to load more than two items in a bucket, this may be accomplished by adding another loading station 118 downstream of the second loading station 18 with a second item transfer conveyor 139 interconnecting platforms 136 and 236, constructed like platform 36 as described above. Sweeper 40 would be adapted to select and deliver items on platform 136 to a second item transfer conveyor 139 (which is constructed like item transfer conveyor 38 as described above) for delivery of items to platform 236 (which is mounted relative to platform 136 in the same manner as platform 36 is mounted relative to platform 23, as described above). Platform 136 would also be constructed to comprise an upstream rest portion and a downstream portion comprised bomb-bay doors (constructed like platform 23 above) to permit an item to be dropped through into a bucket below. At the third station 118, the third sweeper 140 could simply push a third item off platform 236 in a manner similar to that described above (i.e. moving item 26B into bucket 14 from platform 36). A sensor and signalling device would be required at each of stations 18 and 118, and also, as described above, preferably at station 16.

Thus in this embodiment bomb bay doors at platforms 126 and 136 are initially in the item retention position (i.e. closed). As in the embodiment described above, first loading device 16 operates continuously. Sensor 130, in conjunction with a signalling device (not shown), operates to signal an item feeder (not shown) to drop an item on to item supply conveyor 238. First sweeper 20 operates to sweep a first item from discharge position 242 to first item transfer conveyor 38 via first platform 136. The first item is conveyed by first item transfer conveyor 38 to a position proximate sensor 138. Upon sensor 138 detecting the presence of the first item, and in conjunction with the operation of sensor 142 and the signalling device not detecting an item at platform 236, a signal is sent by the signalling device to second sweeper 40 to begin operation. The second sweeper 40 has a paddle move from a ready position behind the first item to sweep the first item over second platform 136, which has its bomb bay doors in the item retention position, on to second item transfer conveyor 139. Second sweeper 40 moves a paddle to the ready position and then stops. The second item transfer conveyor 139, which also operates continuously, conveys the first item to a position proximate to sensor 142. Upon sensor 142 detecting the presence of the first item, third sweeper 140 is signalled to operate by the signalling device. A paddle of the third sweeper 140 moves from a ready position behind the first item to move the first item on to the third platform 236. Third sweeper 140 then stops with a paddle positioned directly behind the first item, which is at rest on platform 236.

Since first sweeper 20 operates continuously, a second item meanwhile has been conveyed via the item supply conveyor 238 to discharge position 242, over platform 126 and on to first item transfer conveyor 38. Item transfer conveyor 38 conveys the second item to a position proximate sensor 138. Upon sensor 138 detecting the presence of the second item, and in conjunction with the operation of sensor 142, which has previously detected the first item located on third platform 236, the second sweeper 40 and the bomb bay doors of first platform 126 are signalled to operate and open by the signalling device. The second sweeper, in this instance, operates to sweep the second item from a position proximate sensor 138 on to the upstream rest portion of second platform 136, which has its bomb bay doors move to an open position. At this point, second sweeper 40 stops thereby retaining the second item on the upstream rest portion of second platform 136, upstream of the open bomb bay doors. Meanwhile, a third item is being delivered by the item supply conveyor 238 to discharge position 242 and is thereafter swept by first sweeper 20 through the open bay doors of platform 126. The third item drops into a bucket located beneath first platform 126 at position 14a. The third item conveyed by bucket 14 is then detected by sensor 244. Upon this detection of the third item in bucket 14, the signalling device signals both second sweeper 40 and third sweeper 140 to start moving. The movement of sweeper 40 is synchronized with the movement of conveyor 12 so that when bucket 14 carrying the third item reaches position 14b the second item will be pushed off platform 136 through the open bomb bay doors and into bucket 14 carrying the third item. This results in bucket 14 holding the third and second items. The signalling device then signals the bomb bay doors of platform 136 to return to the item retention position (i.e. closed). The movement of the third sweeper 140 is also synchronized with the movement of conveyor 12 such that the first item is accelerated to the speed of the conveyor 12 and bucket 14, so that the first item will be pushed off platform 236 and will drop into bucket 14 carrying the third and second items when bucket 14 is moving between positions 14c and 14d. The loading of the first item is effected by the third sweeper 140 accelerating, via its paddles, the first item located on platform 236 to a zero horizontal velocity relative to buckets 14. As a result, the first item located on platform 236 is swept into bucket 14 carrying the second and third items. Bucket 14, carrying the three items, is then conveyed to position 14d proximate to the container loading machine 240. The three items in bucket 14 are then loaded into a container, such as a box, in the manner known in the art. In a further embodiment, the operation of sweeper 140 to load the first item, can be linked to the detection of the bucket carrying the second and third item by a sensor located proximate but downstream of position 14b. This sensor, in conjunction with the signalling device, will, on detecting the presence of the second and third items in bucket 14, signal third sweeper 140 to begin operation.

Figure 9A:
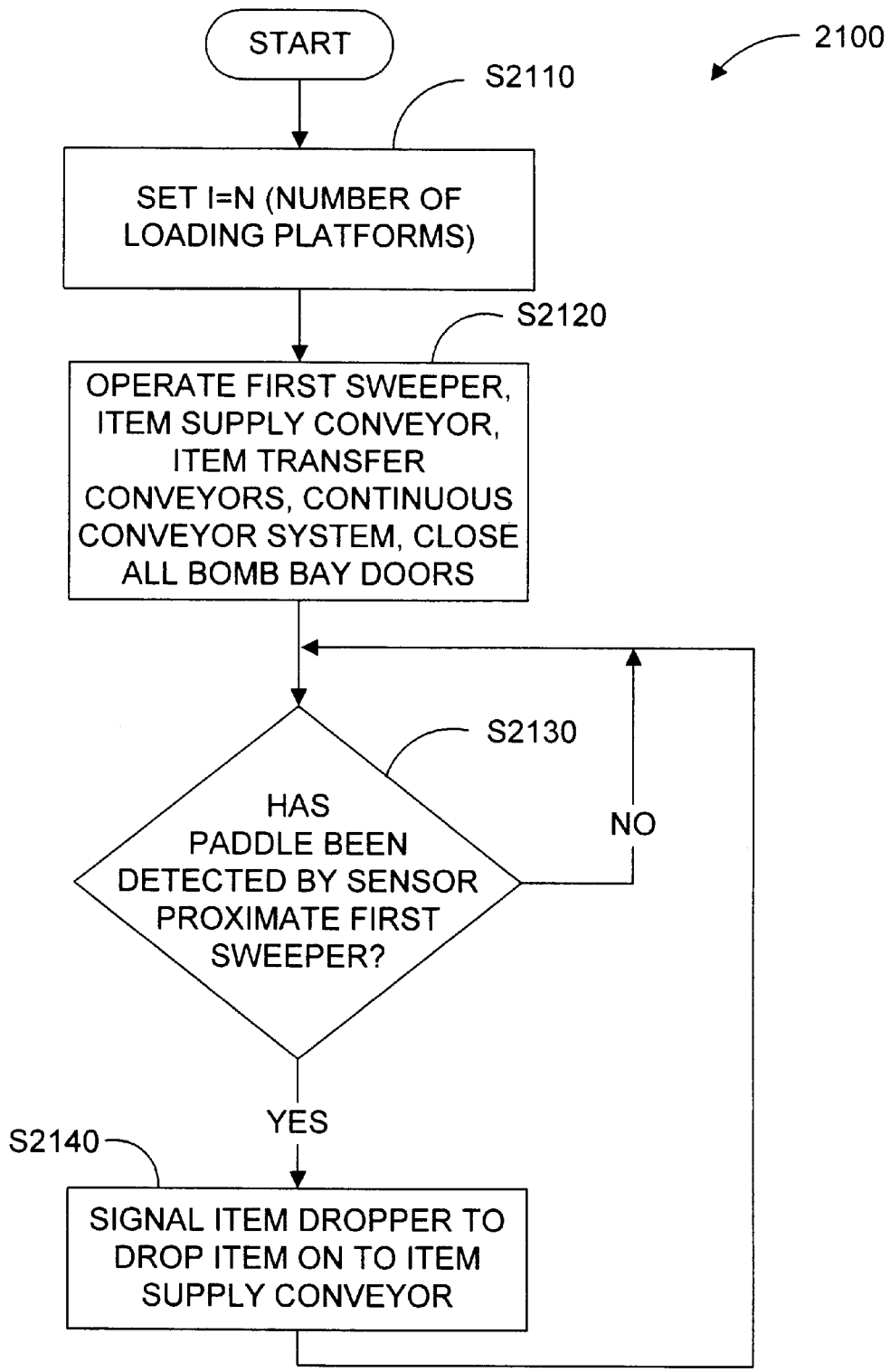
FIGS. 9a, 9b and 9c comprise a flow chart illustrating one method of operation of the embodiment of the system of FIG. 8.

Referencing the flowchart in FIGS. 9a, 9b and 9c, the embodiment of the system will operate in the following manner. In the embodiment of FIG. 8, the number of loading platforms is three (3) (i.e. N=3). The loading of items on to the item supply conveyor is generally referred to as operations 2100 in FIG. 9a. A variable "I" is set to be equal to N (S2110). The first sweeper 20, item supply conveyor 238, item transfer conveyors 38, 139 and the continuous conveyor system comprising buckets 14 are operated (S2120). All bomb bay doors on platforms 126, 136 are set to the item retention position (i.e. closed) in step S2120. When sensor 130 detects a paddle (S2130), the item feeder is signalled to drop on item on to item supply conveyor 238. Operations 2100 are carried out continuously and contemporaneously with operations generally referred to as 2200 in FIGS. 9b and 9c.

Figure 9B:
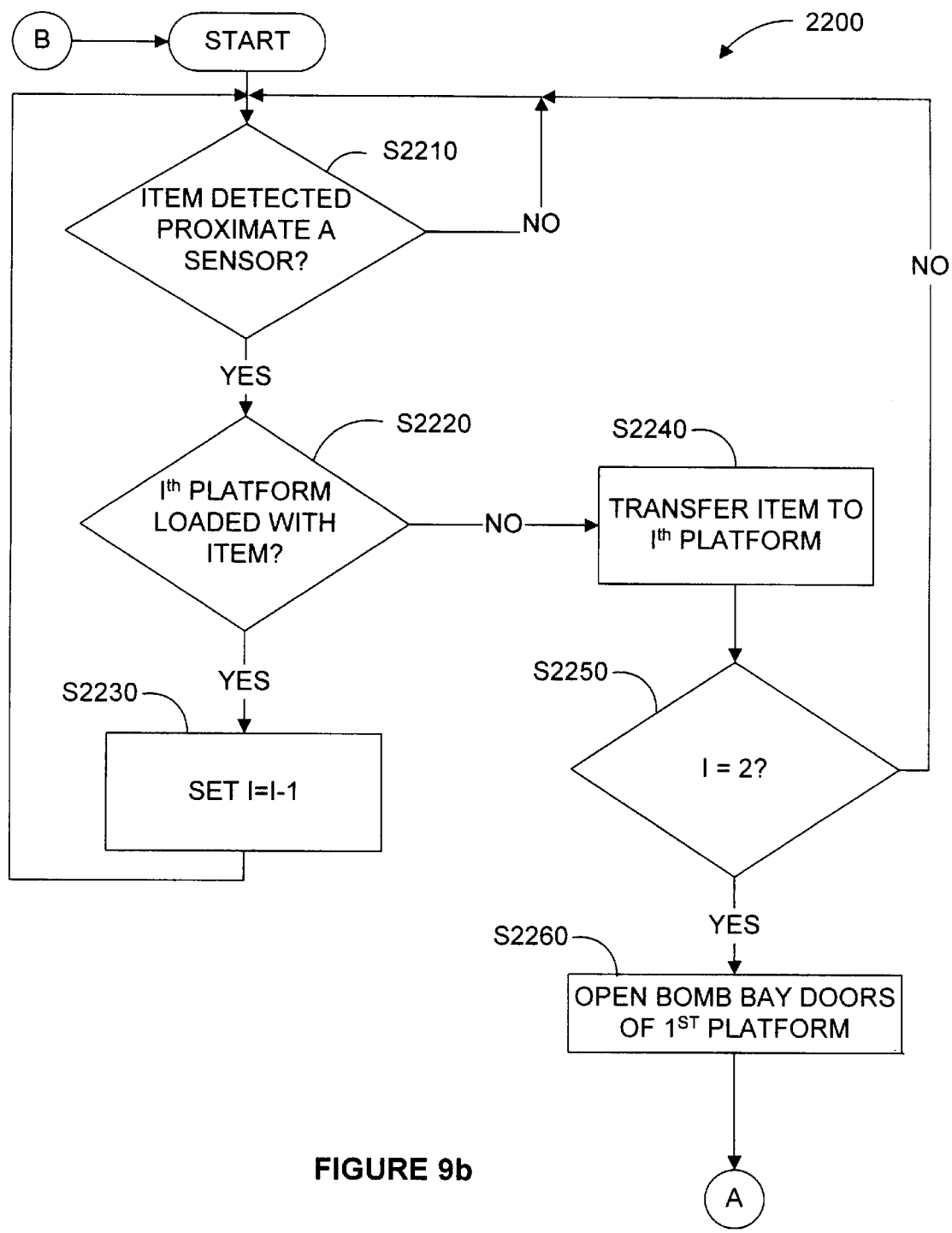
Figure 9C:
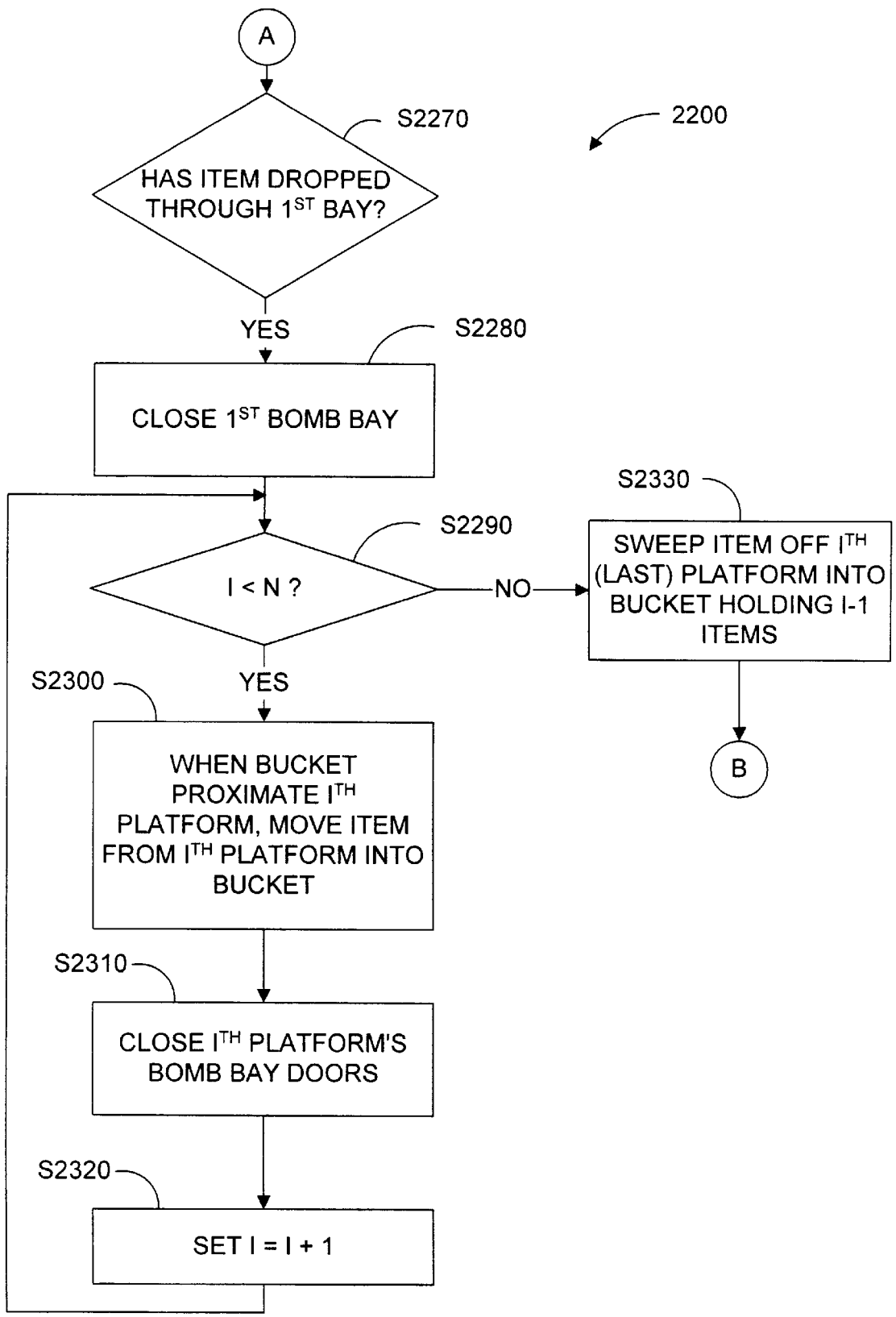

Operations 2200 in FIGS. 9b and 9c generally refer to the loading of items on to platforms 126, 136 and 236 and transferring said items into a bucket 14. If an item has been detected proximate a sensor, preferably sensor 138 (S2200), a determination is made as to whether the $I^{th}$ platform has been loaded with an item (S2220). With a first item, it will be determined whether third platform 236 has been loaded with an item. This determination is made in conjunction with sensor 142. With the first item, it is determined that third platform 236 has not been loaded with an item, as such the first item is transferred to the third platform. If the $I^{th}$ platform is loaded with an item, the variable I is decremented by one (1) (i.e. from three to two) (S2230) and steps S2210 and S2220 are repeated. When S2220 is carried out with variable I being set to two, it is determined that the $I^{th}$ platform (i.e. platform 136) is not loaded and the item proximate to sensor 138 is transferred to platform 136 (S2240). Since variable I has a value of two (2) (S2250), bomb bay doors of first platform 126 are opened (S2260). As a result the next item transferred from discharge position 242 by first sweeper 20 will drop through the open bay of first platform 126.

Referencing FIG. 9c, when it is determined, by sensor 244, that an item has dropped through the bay of first platform 126 into a bucket 14 at position 14a (S2270), bomb bay doors of first platform 126 are returned to the item retention position (i.e. closed) (S2280). A determination is then made (S2290) whether variable I is less than N, the number of platforms. In the first instance variable I is two and there are three platforms. As such step S2300 is carried out. In step S2300 a signal is sent to the $I^{th}$ platform to open its bomb bay doors and for sweeper 40 to operate to push the item through the bomb bay when bucket 14 carrying an item is proximate to the $I^{th}$ platform (position 14b in FIG. 8). As a result bucket 14 will then have two items loaded in it. The bomb bay doors of the $I^{th}$ platform are then signalled to return to the item retention position (i.e. closed) (S2310). Variable I is then incremented by one, in this instance from two to three (S2320). The operation is then returned to step S2290. As variable I is no longer less than N (S2290), step S2330 is carried out. In step S2330, the item loaded on the $I^{th}$ (i.e. third) platform is swept into bucket 14 holding the two items. Operations 2200 are then repeated in their entirety.

It should be noted, that in each embodiment, the signalling devices described above are combined into a single controller, but could be physically provided as separate devices.

It will be further understood that the invention is not limited to the embodiments described herein which are merely illustrative of a preferred embodiment of carrying out the invention, and which are susceptible to modification of form, arrangement of parts, steps, details, and order of operation. The invention, rather, is intended to encompass all such modification with its spirit and scope, as defined by the claims.

I claim:

1. A system for loading first and second items into a holder, said system comprising:
   i) a conveyor having a holder, said holder being movable by said conveyor from a first position to a second position;
   ii) a first loading station located proximate said first position;
   iii) a second loading station located proximate said second position;
   iv) an item deliverer to deliver items to said first loading station and said second loading station;
   v) a loading apparatus adapted to load said second item at said first loading station into said holder and to load said first item at said second loading station into said holder;
   vi) a first sensor for detecting an item that has been selected for delivery to said second loading station
   vii) a signalling device which in response to detection of an item by said sensor, is operable to signal said loading apparatus to load said second item from said first loading station into said holder said system being operable to load said holder with said first and second items by: (a) said item deliverer delivering said first item to said second loading station and said second item to said first loading station; (b) in response to said signalling device signalling said loading apparatus, said loading apparatus loading said second item from said first loading station into said holder at said first position after said first item has been detected by said sensor; (c) said conveyor moving said holder carrying said second item from said first position to said second position; and (d) said loading apparatus loading said first item from said second loading station into said holder at said second position, whereby said holder is loaded with said first and second items.

2. A system as claimed in claim 1, wherein said second item is not loaded into said holder until said first item is being delivered to said second loading station.

3. A system as claimed in claim 1 wherein said second item is not loaded into said holder until said first item has been delivered to said second loading station.

4. A system as claimed in claim 3, wherein the operation of said conveyor is continuous and includes a plurality of holders.

5. A system as claimed in claim 1, wherein the operation of said conveyor is continuous and includes a plurality of holders.

6. A system as claimed in claim 5 wherein said holders comprise buckets.

7. A system as claimed in claim 6, wherein said holders are carried by said conveyor in series.

8. A system as claimed in claim 6 wherein said item deliverer comprises:
   an item supplier to supply said first and second items to said first loading station and deliver said first item to an item transfer apparatus;
   an item transfer apparatus adapted to move said first item from said first loading station toward said second loading station; and
   a first item positioning apparatus for transferring said first item from said item transfer apparatus to said second loading station.

9. A system as claimed in claim 8 wherein said loading apparatus comprises a first loading apparatus positioned proximate said first loading station and a second loading apparatus positioned proximate said second loading station.

10. A system as claimed in claim 9 wherein said system is operable to load a bucket with first and second items by: (a) said item supplier supplying a first item to said first loading station and delivering said first item to said item transfer apparatus; thereafter (b) said first item being delivered to said second loading station by said item transfer apparatus and (c) said item supplier supplying a second item to said first loading station; thereafter (d) said first loading apparatus loading said second item from said first loading station into a bucket at said first position; thereafter (e) said conveyor moving said bucket, carrying said second item, to said second position where said second loading apparatus loads said first item from said second loading station into said bucket, whereby said bucket is loaded with said first and second items.

11. A system as claimed in claim 8 wherein said first loading station comprises a first platform, elevated above said conveyor.

12. A system as claimed in claim 11 wherein said second loading station comprises a second platform, elevated above said conveyor.

13. A system as claimed in claim 12 wherein said item transfer device comprises a conveyor disposed between said first platform and said second platform and operable to move said first item between said first platform and said second platform and operable to move said first item between said first platform and said second platform.

14. A system as claimed in claim 13 wherein said loading apparatus includes a pair of oppositely disposed bomb bay doors in said first platform movable in reciprocating movement between a first closed position wherein said second item at said first loading station is restrained on said first platform, and a second open position wherein said item falls between said bomb bay doors into said bucket;

said item supplier further comprising an item supply conveyor for moving items to an unloading position adjacent said first platform and an item feeder for feeding items to said item supply conveyor; and a second item positioning device, for transferring items from said item supply conveyor on to said first platform and selectively moving some items from said first platform to said item transfer apparatus, and moving other items so that said other items fall through said bomb bay doors into said bucket.

15. A system as claimed in claim 14, wherein said second item positioning device comprises a first sweeper having a plurality of sweeper paddles mounted to a driving mechanism and following a generally obround path wherein a sweeper paddle is operable to move said first item from said item supply conveyor on to said first loading platform and from said first loading platform to said item transfer apparatus, and a sweeper paddle operable to move said second item from said item supply conveyor on to said first platform.

16. A system as claimed in claim 15 further comprising:
   a third sensor for detecting the passing of a sweeper paddle of said first sweeper; and
   a third signalling device for signalling said item feeder to feed an item.

17. A system as claimed in claim 1 wherein:

said first sensor is adapted to detect the presence of said first item when it is proximate said second loading station and said signalling device responsive to detection by said first sensor of said first item proximate said second loading station, being operable to signal said loading apparatus to load said second item from said first loading station into said holder when said holder is at said first position.

18. A system as claimed in claim 17, further comprising a second sensor located proximate said conveyor between said first position and said second position, and adapted to detect the presence of said second item loaded in said holder; and a second signalling device which, in response to detection by said second sensor of a holder carrying said second item, is operable to signal said loading apparatus to load said holder, carrying said second item, at said second position with said first item.

19. A system as claimed in claim 1 wherein said loading apparatus comprises a first loading apparatus for loading said second item at said first loading station into said holder and a second loading apparatus for loading said first item at said second loading station into said holder.

20. A system as claimed in claim 19 wherein step (d) is carried out only in response to earlier step (f), determining that the first item has been selected for delivery to said second loading station.

21. A system for loading first and second items into a holder, said system comprising:

i) a conveyor having a holder, said holder being movable by said conveyor from a first position to a second position;

ii) a first loading station located proximate said first position;

iii) a second loading station located proximate said second position;

iv) an item deliverer to deliver items to said first loading station and said second loading station;

v) a loading apparatus adapted to load said second item at said first loading station into said holder, and to load said first item at said second loading station into said holder;

said system operated to load said holder with said first and second items by: (a) said item deliverer delivering said first item to said second loading station and said second item to said first loading station; (b) said loading apparatus loading said second item from said first loading station into said holder at said first position after said first item has been delivered to said second loading station; (c) said conveyor moving said holder carrying said second item from said first position to said second position; and (d) said second loading apparatus loading said first item from said second loading station into said holder at said second position, whereby said holder is loaded with said first and second items.

22. A system as claimed in claim 21, wherein the operation of said conveyor is continuous and includes a plurality of holders.

23. A system as claimed in claim 21, wherein the operation of said conveyor is continuous and includes a plurality of holders, and wherein said holders comprise buckets and said holders are carried by said conveyor in series.

24. A system as claimed in claim 21 wherein said loading apparatus comprises a first loading apparatus located for loading said second item at said first loading station into said holder and a second loading apparatus for loading said first item at said second loading station into said holder.

25. A system for loading first and second items into a holder, said system comprising:

i) a conveyor having a holder, said holder being movable by said conveyor from a first position to a second position;

ii) a first loading station located proximate said first position;

iii) a second loading station located proximate said second position;

iv) an item deliverer for selecting and delivering items to said first loading station and said second loading station;

v) a loading apparatus adapted to load said second item at said first loading station into said holder and to load said first item at said second loading station into said holder;

said system operated to load said holder with said first and second items according to the method comprising the steps:

(a) said item deliverer selecting a first item for delivery to said second loading station;

(b) said item deliverer delivering said first item to said second loading station;

(c) said item deliverer delivering a second item to said first loading station;

(d) after step (b), said loading apparatus loading said second item from said first loading station into said holder at said first position;

(e) after step (d), said loading apparatus loading said fist item from said second loading station into said holder located at said second position.

26. A system as claimed in claim 25 wherein said system comprises a first sensor for detecting an item that has been selected for delivery to said second loading station and a signalling device which in response to detection of an item by said sensor, is operable to signal said loading apparatus to load said second item from said second loading station into said holder, and wherein said method comprises the further step (f) which is performed after step (c), step (f) comprising detecting an item has been selected for delivery to said second loading station and then signalling said loading apparatus to load said second item into said holder at said first position.

27. A system as claimed in claim 26 wherein step (d) is carried out after step (b).

28. A system for loading first and second items into a holder, said system comprising:

i) a conveyor having a holder, said holder being movable by said conveyor from a first position to a second position;

ii) a first loading station located proximate said first position;

iii) a second loading station located proximate said second position;

iv) an item deliverer to deliver items to said first loading station and to deliver items from said first loading station to said second loading station;

v) a loading system adapted to load said second item at said first loading station into said holder and to load said first item at said second loading station into said holder;

vi) a sensor which detects the absence of an item at said second loading station;

vii) a signalling device which in response to detection of the absence of an item at said second loading station is operable to signal said item deliverer to deliver an item from said first loading station to said second loading station;

said system being operable to load said holder with said first and second items according to the method comprising the steps:

(a) said item deliverer delivering a first item to said first loading station;

(b) said sensor detecting there is no item at said second loading station;

(c) in being signalled by said signalling device that there is no item at said second loading station, said item deliverer delivering said first item at said first loading station to said second loading station;

(d) said item deliverer delivering a second item to said first loading station;

(e) said loading system loading said second item at said first loading station into said holder located at said first position;

(f) said loading system loading said first item from second loading station into said holder located at said second position.

29. A system for loading first and second items into a holder, said system comprising:

i) a conveyor having a holder, said holder being movable by said conveyor from a first position to a second position;

ii) a first loading station located proximate said first position;

iii) a second loading station located proximate said second position;

iv) an item deliverer to deliver items to said first loading station and said second loading station, said item deliverer comprising means for delivering said first item to said second loading station before said loading apparatus loads said second item from said first loading station into said holder;

v) a loading apparatus adapted to load said second item at said first loading station into said holder, and to load said first item at said second loading station into said holder;

said system being operable to load said holder with said first and second items by: (a) said item deliverer delivering said first item to said second loading station and said second item to said first loading station; (b) said loading apparatus loading said second item from said first loading station into said holder at said first position after said first item has been delivered to said second loading station; (c) said conveyor moving said holder carrying said second item from said first position to said second position; and (d) said second loading apparatus loading said first item from said second loading station into said holder at said second position, whereby said holder is loaded with said first and second items.

30. A system for loading first and second items into a holder, said system comprising:

i) a conveyor having a holder, said holder being movable by said conveyor from a first position to a second position;

ii) a first loading station located proximate said first position;

iii) a second loading station located proximate said second position;

iv) an item deliverer for selecting and delivering items to said first loading station and said second loading station, said item deliverer comprising means for delivering said first item to said second loading station before said loading apparatus loads said second item from said fire loading station into said holder, v) a loading apparatus adapted to load said second item at said first loading station into said holder; and to load said first item at said second loading station into said holder, said system being operable to load said holder with said first and second items according to the method comprising the steps:

(a) said item deliverer selecting a first item for delivery to said second loading station;

(b) said item deliverer delivering said first item to said second loading station;

(c) said item deliverer delivering a second item to said first loading station;

(d) after step (b), said loading apparatus loading said second item from said first loading station into said holder at said first position;

(e) after step (d), said loading apparatus loading said first item from said second loading station into said holder located at said second position.

* * * * *

UNITED STATES PATENT AND TRADEMARK OFFICE
CERTIFICATE OF CORRECTION

PATENT NO. : 6,044,957
DATED : April 4, 2000
INVENTOR(S) : Peter Guttinger

It is certified that error appears in the above-identified patent and that said Letters Patent are hereby corrected as shown below:

In column 11, line 50, replace "claim 3" with --claim 1--.
In column 11, line 53, replace "claim 1" with --claim 3--.
In column 11, line 56, replace "claim 5" with --claim 4--.
In column 12, line 66, delete "third".
In column 13, line 26, replace "19" with --27--.
In column 14, line 32, replace "fist" with --first--.
In column 16, line 25, replace "fire" with --first--.

Signed and Sealed this

Twenty-ninth Day of May, 2001

Attest:

NICHOLAS P. GODICI

*Attesting Officer*   *Acting Director of the United States Patent and Trademark Office*